United States Patent [19]

Morin

[11] Patent Number: 4,716,058
[45] Date of Patent: Dec. 29, 1987

[54] METHOD OF CURTAIN COATING TO MAKE THIN DIELECTRIC CERAMIC LAYERS

[75] Inventor: Thomas M. Morin, Adams, Mass.

[73] Assignee: Sprague Electric Company, North Adams, Mass.

[21] Appl. No.: 899,832

[22] Filed: Aug. 25, 1986

[51] Int. Cl.$^4$ .............................................. B05D 1/30
[52] U.S. Cl. ...................................... 427/420; 427/9; 427/10; 118/688; 118/324; 118/DIG. 4
[58] Field of Search .................. 264/40.2, 40.7; 427/420, 9, 10; 118/688, 300, DIG. 4, 324; 425/141

[56] References Cited

U.S. PATENT DOCUMENTS

| | | | |
|---|---|---|---|
| 2,797,171 | 6/1957 | Fralish | 117/7 |
| 2,884,531 | 4/1959 | Bosch | 425/141 X |
| 3,212,127 | 10/1965 | Flook et al. | 425/141 |
| 3,599,288 | 8/1971 | Eakman | 425/141 X |
| 3,717,487 | 2/1973 | Hurley et al. | 106/48 |
| 4,060,649 | 11/1977 | Coleman | 427/79 |
| 4,342,423 | 8/1982 | Coleman | 427/420 X |
| 4,510,175 | 4/1985 | Burn | 427/79 |

FOREIGN PATENT DOCUMENTS 58-81126 5/1983 Japan ......................... 264/40.2

*Primary Examiner*—Shrive P. Beck

[57] ABSTRACT

The dielectric layer or layers in a ceramic capacitor having at least one buried electrode is deposited by a curtain coating process that includes obtaining a measure of the ceramic-paint-curtain thickness. A source of electromagnetic radiation, e.g. in the infrared range, is directed equally near the left and right edges of the curtain, and detectors at the opposite curtain surface side pick up the difference in the radiation transmissivity which is a measure of curtain thickness assymetry left to right. By adjusting the paint reservoir from which the curtain issues to make the difference zero and the curtain symmetrical, uniformity in paint coating thickness is achieved.

9 Claims, 2 Drawing Figures

METHOD OF CURTAIN COATING TO MAKE THIN DIELECTRIC CERAMIC LAYERS

BACKGROUND OF THE INVENTION

This invention relates to coating using a paint curtain machine and more particularly to depositing uniformly thick dielectric ceramic layers for making capacitors.

Among the methods for forming thin dielectric ceramic layers in the manufacture of ceramic capacitors, the best known are casting, extruding, spraying and curtain coating. It is the improvement of curtain coating for that use that is the subject of this invention.

The thickness of a coating having been so deposited is determined by the thickness of the falling curtain and the speed with which the substrate is passed through the curtain to acquire the paint coating. A curtain coating machine of the kind having a paint reservoir with a dam or wier built into one wall from which the paint falls is described by Coleman in the patent U.S. Pat. No. 4,060,649 issued Nov. 29, 1977 and assigned to the same assignee as is the present invention.

The method described by Coleman entails providing a moving conveyor belt in the curtain. Substrates to be coated are placed on the conveyor belt, passed through the curtain and retrieved on the other side. No means are provided for monitoring the thickness of the falling curtain.

It is known to measure the thickness of lacquer deposited continuously on a translucent web by exposing one side to the light of a lamp and measuring the amount of light transmitted through the combination web-with-coating as a measure of coating thickness. However, any changes or non linearities in the thickness and light transparency of the translucent web become a source of uncertainty and error in that coating thickness measure. Furthermore, for making ceramic capacitors it is desirable to put down successive coatings of a ceramic paint interleaved with buried electrodes wherein control of thickness of each layer is needed, in which case the prior art method becomes ineffectual altogether for measuring the successive layers.

It is therefore an object of this invention to overcome the above-noted limitations of the prior art.

It is an object of this invention to provide a method for obtaining a measure of the curtain thickness.

It is another object of this invention to provide such a method wherein both sides of the falling curtain are monitored and the reservoir is physically adjusted for providing a uniformly thick curtain and thus providing a uniformly thick paint coating everywhere on the substrate.

SUMMARY OF THE INVENTION

A method for painting the surface of a substrate for making ceramic capacitors includes the prior art steps of delivering ceramic paint into a reservoir that has one side wall serving as a dam over which the paint falls forming a thin curtain, and passing a substrate through the falling paint curtain. Alternately the paint is forced out a slot in the reservoir to form the falling curtain.

This invention represents an improvement over that method and stems from recognition of the problem that the achievement of symmetry of thickness from one edge to the other in the paint curtain may require very fine adjustment prior to a coating run. That adjustment becomes increasingly critical as the curtain becomes thinner. Thinner paint curtains are needed for making thinner ceramic dielectric layers in a capacitor—a trend that is accelerating in the industry.

A source of electromagnetic radiation is directed at the surface of the curtain equally near a left and a right edge of the curtain. The transmitted radiation through the curtain is sensed near those left and right edges and by physically adjusting the level of the dam to obtain an equal transmission of radiation near the two edges, a very exact curtain symmetry is achieved that is translated directly to uniformity in thickness of the paint coating on the substrate from a corresponding left and right substrate edge.

This method for obtaining a measure of curtain thickness is completely independent of the transmissivity to radiation of the substrate or any previously deposited under layers of electrode inks or ceramic paint. It is particularly useful for controlling symmetry and for maintaining the curtain thickness as a function of time when the curtain is very thin. For making dielectric ceramic layers less thick than 0.001 inch (25 microns) the desired average paint curtain thickness will be less than 0.006 inch (150 microns). The prior art method of directly measuring the paint coating on a dummy substrate by weighing cannot give symmetry information and cannot give a measure of thickness simultaneous with depositing a capacitor dielectric layer. But for the above-noted very thin paint curtain the control of coating thickness symmetry and thickness as a function of time becomes more critical and the sensitive and continuous real-time measurement in the method of this invention leads to a substantial improvement in dielectric coating uniformity.

DESCRIPTION OF THE PREFERRED EMBODIMENTS

A ceramic paint or slip for curtain coating consists of a suspension of ceramic particles in a liquid that includes a binder and a surfactant dissolved in a non aqueous vehicle. Such paints are described by Hurley in U.S. Pat. No. 3,717,487 issued Feb. 20, 1973 and by Burn in U.S. Pat. No. 4,510,175 issued Apr. 9, 1985. Both patents are assigned to the same assignee as is the present invention.

Figure 1:
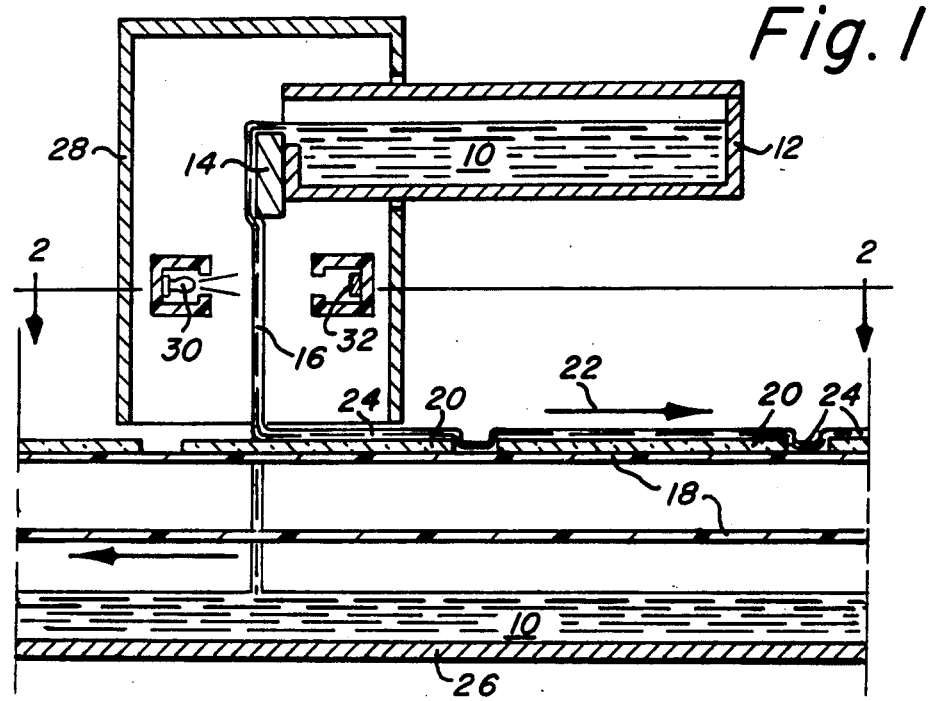
FIG. 1 shows in a side sectional view a curtain coating machine having a curtain thickness detector mechanism suitable for use in the method of the invention.

Referring to FIG. 1, the paint 10 is loaded into the reservoir 12. The paint 10 spills over the dam formed by the wier bar 14 at the short wall of reservoir 12 and forms a falling sheet or curtain 16 of the paint 10. A conveyor belt carries cardboard substrates 20 through the paint curtain 16 in the direction of arrow 22.

The paint coating 24 deposited on the belt 18 and substrates 20 has a thickness that is a function of the speed of the belt 18 and the thickness of the paint curtain 16. Excess paint 10 drops into the pan 26 and is pumped back into the reservoir 12. The thickness of the curtain 16 is directly related to the rate of pumping.

Each substrate 20 is re-passed through the falling sheet until a build-up of 1 to 2 mils (25 to 50 microns) is obtained. The build-up is dried to remove the vehicle.

An electroding ink comprising a fine powder of a silver/palladium alloy and an organic vehicle is selectively screen printed in a matrix pattern of ink film patches onto the surface of the green ceramic build-up. The substrate is then passed again through the falling paint curtain 16, dried and screen printed with another pattern of ink patches registered with the underlying first one. This sequence is repeated until the stack contains a desired number N of "active dielectric layers" and N+1 electrode patterns. Then a few more passes through the curtain 16 are made without more electroding ink to complete the stack.

During the application of each succeeding ceramic layer the stack is maintained at a temperature of between about 55°–80° C. to facilitate removal from each coating of the solvents in the paint as well as those in the ink.

The final stack and substrate are mounted on a horizontal table that is movable in a horizontal direction. A single, long, sharp razor blade is pushed down through the green ceramic stack, sometimes referred to as the cake. The blade is withdrawn; the table is moved a predetermined distance in said direction that is perpendicular to the vertical plane of the blade; and the blade is lowered to cut through the ceramic cake again and withdrawn. The table is again moved the predetermined distance in the same direction and the process is repeated until the blade is near the edge of the cake.

The substrate and cake are rotated ninety degrees on the table and the above-noted sequential cutting process is run again except the table is moved each time another predetermined distance, usually different than the first predetermined distance because it is usually desired the each body have a different dimension in width than in length.

The substrate is then demounted from the cutting table, and the diced green ceramic cake is removed from the substrate 20 by flexing the cardboard and/or by pushing the cake relative to the substrate in a direction in the plane of the interface there between.

The above-noted electroding ink patterns are designed such that the above-noted cutting may be co-registered with the ink patterns to the effect that each individual cut-apart green capacitor body contains a first set of buried electrodes extending only to one cut edge and a second set of buried electrodes interdigitated with the first and extending to the opposite cut edge.

The green bodies are then baked out at 800° C. for a few hours to remove essentially all of the organic materials and are then sintered to maturity at from 1100° C. to 1250° C. A silver paste was applied to the opposite pair of cut edges at which the buried electrodes extend. The bodies were again fired at 750° C. for a few minutes to form silver terminations and complete the manufacture of these monolithic multilayer ceramic capacitors.

A paint-curtain-thickness measuring device has a light source (or source of radiation at other wavelengths) 30 held to shine on one side of the paint curtain 16 and a light detector or sensor (or detector of said other wavelengths) 32 is held at a point on the other side of the curtain 16 opposite the source 30 to receive light having been transmitted from the source 30 through the curtain 16.

The source 30 and the detector 32 are mounted respectively on rods 34 and 36 and thereby maintained opposite each other. The rods 34 and 36 are held fixed relative to each other by a commonly attached bar 38 and are supported in bushings 40 and 42 respectively that permit rods 34 and 36 to be moved in an axial direction as indicated by arrows 44 and 46. By pushing or pulling the rods 34 and 36, the source 30 and detector 32 are moved horizontally from one point in the paint curtain to the other.

It should be noted that the transmissivity to radiation of a paint curtain will vary as a function of paint formulation. For example, the ratio of the ceramic particles to paint vehicle by volume is a determinant of paint transmissivity. Thus for absolute measurements of curtain thickness, the measurement instrument of this invention must be calibrated for each paint formulation.

A shield 28 is placed about the curtain 16 to shield against ambient radiation that may be detectable by the sensor 32 and cause an erroneous measure of curtain thickness.

Figure 2:
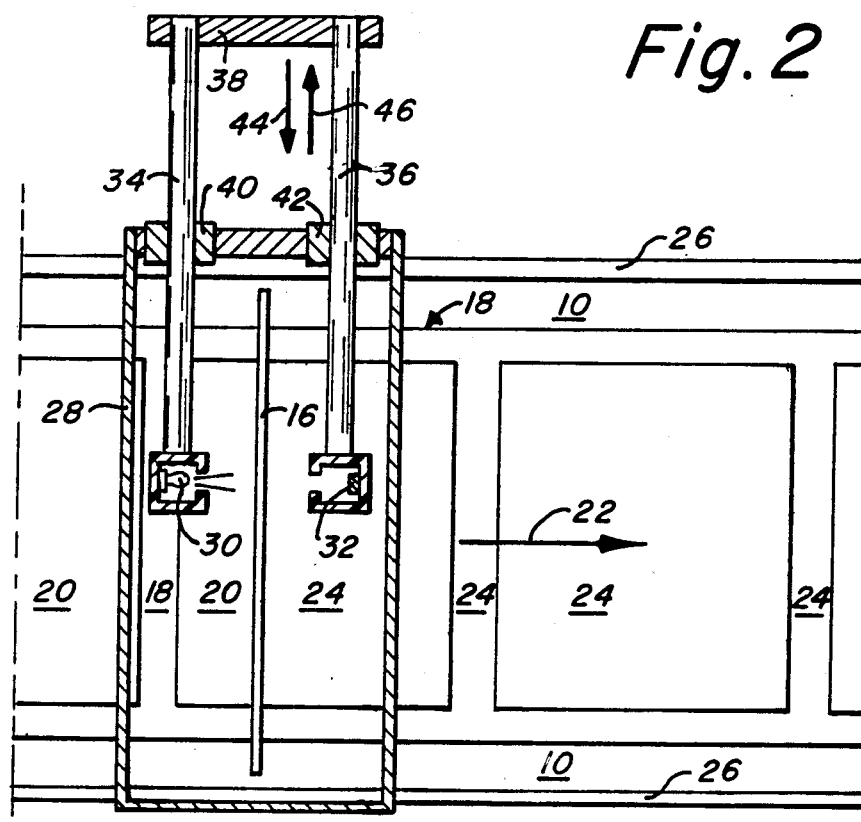
FIG. 2 shows in top sectional view the curtain coating machine and curtain thickness detector of FIG. 1 taken in plane 2—2.

A curtain coating machine was equipped with a source of steady (regulated) infrared radiation (30) comprised of a standard electrical cartridge heater and an infrared pyrometer (32), Model OS-600 made by Omega Engineering in Stamford, Conn. Both are mounted as shown in FIGS. 1 and 2. At the level of about 1 mil (25 microns) coating thickness as sintered, the resolution obtained using a strip chart recorder connected to the pyrometer output was better than 1.0 micron. In the case of the deposition of a coating that was 1 mil thick after sintering, the curtain thickness was 5.5 mils (137 microns) and the wet coating thickness was 4 mils (100 microns). Thicker curtains become so opaque that this instrument becomes relatively insensitive and ineffective.

In order to control the thickness of the coating being deposited as a function of time, the paint pumping rate may be adjusted to maintain the paint curtain thickness constant. An increase in pumping rate causes a thickening of the curtain and of the coating. An amplifier may be connected between the infrared sensor 32 and the paint pump (not shown) to provide automatic means of paint curtain thickness control. Otherwise, the sensor 32 may drive a voltmeter and an operator may adjust the pump speed to keep the voltmeter indication constant.

By moving the radiation source 30 and sensor 32 from near one edge to the other edge of the curtain 16 differences in curtain thickness may be detected and eliminated by adjusting the tilt of the paint dam 14.

An alternative means for measuring the thickness near the left and right curtain edges is the use of separate but fixed and equally brilliant sources of radiation (not illustrated) at the two edges. Two fixed and equally sensitive sensors are then provided in corresponding positions, respectively, on the oppstie curtain side. The difference in output from these two sensors is then the measure of an unsymmetrically thick paint curtain.

The uniformity of a coating thickness of 6 microns could be maintained uniform to within less than 0.02 microns. As the curtain becomes thinner and more transparent, the resolution improves so that the usefulness of this instrument for even thinner coatings will be enhanced where it is needed most.

In a variation on the method of this invention the paint reservoir may be one of the closed type having instead of a wier, an essentially horizontal slot out of which the paint is forced to exit and from which it falls in the form of a thin curtain. Here again the paint pumping rate or rate at which paint is forced into the closed reservoir determines the rate at which it exits the slot and the thickness of the curtain. In this case the dimensions of the slot may be adjusted to adjust the symmetry as well as the average thickness of the falling curtain. Otherwise, curtain symmetry may be adjusted by tilting the slot relative to a horizontal plane because the thickness at any point in a falling curtain diminishes as a function of the distance it has fallen.

What is claimed is:

1. A method for making a ceramic capacitor having at least one buried electrode including depositing at least one foundation ceramic-paint coating on a substrate, depositing one patterned electroding ink film on said foundation coating, depositing a dielectric-ceramic-paint coating over said film and depositing another patterned electroding ink film on said dielectric-ceramic-paint coating, wherein the improvement comprises:

continuously pumping a dielectric-ceramic paint into a reservoir of the kind that discharges said paint as a falling paint curtain; directing a source of electromagnetic radiation through said curtain equally near the left edge and near the right edge of said curtain; sensing the radiation transmitted through said curtain;

passing said substrate through said falling paint curtain to accomplish said depositing of said dielectric-ceramic-paint; and adjusting the symmetry of paint discharge from said reservoir to cause the radiation through said curtain near said left edge of said curtain to equal the transmitted radiation near said right edge so that the falling curtain is equally thick near both said edges and said dielectric-ceramic-paint coating is rendered uniformly thick between opposite edges on said substrate.

2. The method of claim 1 wherein said sensing is accomplished by positioning a radiation-to-electrical-voltage transducer on the opposite side of said curtain from that of said radiation source, said source and sensor being mounted together and moved together from one edge of the curtain to the other to scan essentially the whole breadth of the falling curtain to provide a measure of its thickness everywhere.

3. The method of claim 1 wherein said sensing is accomplished by provided two fixedly mounted radiation sensors at said left and right edges of said curtain respectively.

4. The method of claim 1 wherein said radiation is in the infrared range of the electromagnetic spectrum.

5. The method of claim 1 additionally comprising collecting curtain paint that did not coat said substrate under said falling curtain and pumping it back into said reservoir to form a closed paint loop including said curtain, said pump and said reservoir; adding a liquid vehicle to said pumped paint to replace that lost to evaporation; and adjusting the rate of adding said vehicle to maintain said transmitted radiation essentially constant as a function of time.

6. The method of claim 1 wherein said reservoir has one side wall portion with a top edge lower than that of the rest of said side wall to serve as a dam over which said paint falls to form said curtain.

7. The method of claim 6 wherein said adjusting is accomplished by physically adjusting the level of said dam.

8. The method of claim 1 wherein the thickness of said curtain at the point of irradiation is less than 6 mils (150 microns).

9. The method of claim 1 wherein said reservoir is a complete enclosure except of an elongated orifice in a wall thereof through which said pumped paint is forced out to form a falling paint curtain, and physically adjusting the dimension of said reservoir orifice to accomplish said adjusting.

* * * * *